US006694425B1

United States Patent
Eickemeyer

(10) Patent No.: US 6,694,425 B1
(45) Date of Patent: Feb. 17, 2004

(54) SELECTIVE FLUSH OF SHARED AND OTHER PIPELINE STAGES IN A MULTITHREAD PROCESSOR

(75) Inventor: Richard James Eickemeyer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,930

(22) Filed: May 4, 2000

(51) Int. Cl.[7] .................................................. G06F 9/40
(52) U.S. Cl. ...................... 712/216; 712/228
(58) Field of Search ................................. 712/219, 216, 712/228

(56) References Cited

U.S. PATENT DOCUMENTS

| | | | | | |
|---|---|---|---|---|---|
| 6,058,466 | A | * | 5/2000 | Panwar et al. | 712/15 |
| 6,230,251 | B1 | * | 5/2001 | Batten et al. | 712/11 |
| 6,272,520 | B1 | * | 8/2001 | Sharangpani et al. | 709/108 |
| 6,292,860 | B1 | * | 9/2001 | Cochcroft et al. | 710/108 |
| 6,317,821 | B1 | * | 11/2001 | Batten et al. | 712/200 |
| 6,484,254 | B1 | * | 11/2002 | Chowdhury et al. | 712/216 |
| 6,542,991 | B1 | * | 4/2003 | Joy et al. | 712/228 |

OTHER PUBLICATIONS

Gunther, Bernard K, "Multithreading with Distributed Functional Units", Apr. 1997, IEEE Transactions on Computers, vol. 46, No. 4, pp. 399–411.*

* cited by examiner

Primary Examiner—Eddie Chan
Assistant Examiner—Charles Harkness
(74) Attorney, Agent, or Firm—Karuna Ojanen

(57) ABSTRACT

In a simultaneous multithread processor, a flush mechanism of a shared pipeline stage is disclosed. In the preferred embodiment, the shared pipeline stage happens to be one or all of the fetch stage, the decode stage, and/or the dispatch stage and the flush mechanism flushes instructions at the dispatch stage and earlier stages. The dispatch flush mechanism detects when an instruction of a particular thread is stalled at the dispatch stage of the pipelined processor. Subsequent instructions of that thread are flushed from all pipeline stages of the processor up to and including the dispatch stage. The dispatch stage is distinguished as being the stage in which all resources necessary for the successful dispatch of the instruction to the issue queues are checked. If a resource required only by that instruction is unavailable, then a dispatch flush is performed. Flush prioritization logic is available to determine if other flush conditions, including a previous dispatch flush, exist for that particular thread. If so, the flush prioritization logic will determine which flush, if any, should proceed. Those resources necessary for the successful dispatch and issuance of the instruction to the execution units but which are unavailable may be private or separate registers for each thread, may be special purpose or other non-renamed registers, or may be instructions for synchronized access to memory. This dispatch flush mechanism is more efficient than existing flush mechanisms which must flush throughout the processor pipelines up to and including the issue queues and execution units and result registers.

15 Claims, 5 Drawing Sheets

SELECTIVE FLUSH OF SHARED AND OTHER PIPELINE STAGES IN A MULTITHREAD PROCESSOR

TECHNICAL FIELD

The present invention relates in general to an improved data processing system and in particular to an improved system and method for switching threads of execution when execution of a thread is stalled in the dispatch stage of a multithread pipelined processor and flushing the stalled thread from earlier stages of pipeline.

BACKGROUND OF THE INVENTION

From the standpoint of the computer's hardware, most systems operate in fundamentally the same manner. Computer processors actually perform very simple operations quickly, such as arithmetic, logical comparisons, and movement of data from one location to another. What is perceived by the user as a new or improved capability of a computer system, however, may actually be the machine performing the same simple operations at very high speeds. Continuing improvements to computer systems require that these processor systems be made ever faster.

One measurement of the overall speed of a computer system, also called the throughput, is measured as the number of operations performed per unit of time. Conceptually, the simplest of all possible improvements to system speed is to increase the clock speeds of the various components, particularly the clock speed of the processor. So that if everything runs twice as fast but otherwise works in exactly the same manner, the system will perform a given task in half the time. Computer processors which were constructed from discrete components years ago performed significantly faster by shrinking the size and reducing the number of components; eventually the entire processor was packaged as an integrated circuit on a single chip. The reduced size made it possible to increase the clock speed of the processor, and accordingly increase system speed.

Despite the enormous improvement in speed obtained from integrated circuitry, the demand for ever faster computer systems still exists. Hardware designers have been able to obtain still further improvements in speed by greater integration, by further reducing the size of the circuits, and by other techniques. Designers, however, think that physical size reductions cannot continue indefinitely and there are limits to continually increasing processor clock speeds. Attention has therefore been directed to other approaches for further improvements in overall throughput of the computer system.

Without changing the clock speed, it is still possible to improve system speed by using multiple processors. The modest cost of individual processors packaged on integrated circuit chips has made this practical. The use of slave processors considerably improves system speed by off-loading work from the central processing unit (CPU) to the slave processor. For instance, slave processors routinely execute repetitive and single special purpose programs, such as input/output device communications and control. It is also possible for multiple CPUs to be placed in a single computer system, typically a host-based system which serves multiple users simultaneously. Each of the different CPUs can separately execute a different task on behalf of a different user, thus increasing the overall speed of the system to execute multiple tasks simultaneously.

Coordinating the execution and delivery of results of various functions among multiple CPUs is a tricky business; not so much for slave I/O processors because their functions are pre-defined and limited but it is much more difficult to coordinate functions for multiple CPUs executing general purpose application programs. System designers often do not know the details of the programs in advance. Most application programs follow a single path or flow of steps performed by the processor. While it is sometimes possible to break up this single path into multiple parallel paths, a universal application for doing so is still being researched. Generally, breaking a lengthy task into smaller tasks for parallel processing by multiple processors is done by a software engineer writing code on a case-by-case basis. This ad hoc approach is especially problematic for executing commercial transactions which are not necessarily repetitive or predictable.

Thus, while multiple processors improve overall system performance, it is much more difficult to improve the speed at which a single task, such as an application program, executes. If the CPU clock speed is given, it is possible to further increase the speed of the CPU, i.e., the number of operations executed per second, by increasing the average number of operations executed per clock cycle. A common architecture for high performance, single-chip microprocessors is the reduced instruction set computer (RISC) architecture characterized by a small simplified set of frequently used instructions for rapid execution, those simple operations performed quickly as mentioned earlier. As semiconductor technology has advanced, the goal of RISC architecture has been to develop processors capable of executing one or more instructions on each clock cycle of the machine. Another approach to increase the average number of operations executed per clock cycle is to modify the hardware within the CPU. This throughput measure, clock cycles per instruction, is commonly used to characterize architectures for high performance processors.

Processor architectural concepts pioneered in high performance vector processors and mainframe computers of the 1970s, such as the CDC-6600 and Cray-1, are appearing in RISC microprocessors. Early RISC machines were very simple single-chip processors. As Very Large Scale Integrated (VLSI) technology improves, additional space becomes available on a semiconductor chip. Rather than increase the complexity of a processor architecture, most designers have decided to use the additional space to implement techniques to improve the execution of a single CPU. Two principal techniques utilized are on-chip caches and instruction pipelines. Cache memories store data that is frequently used near the processor and allow instruction execution to continue, in most cases, without waiting the full access time of a main memory. Some improvement has also been demonstrated with multiple execution units with hardware that speculatively looks ahead to find instructions to execute in parallel. Pipeline instruction execution allows subsequent instructions to begin execution before previously issued instructions have finished.

The superscalar processor is an example of a pipeline processor. The performance of a conventional RISC processor can be further increased in the superscalar computer and the Very Long Instruction Word (VLIW) computer, both of which execute more than one instruction in parallel per processor cycle. In these architectures, multiple functional or execution units are connected in parallel to run multiple pipelines. The name implies that these processors are scalar processors capable of executing more than one instruction in each cycle. The elements of superscalar pipelined execution include an instruction fetch unit to fetch more than one instruction at a time from a cache memory, instruction decoding logic to determine if instructions are independent and can be executed simultaneously, and sufficient execution units to execute several instructions at one time. The execution units may also be pipelined, e.g., floating point adders or multipliers may have a cycle time for each execution stage that matches the cycle times for the fetch and decode stages.

In a superscalar architecture, instructions may be completed in-order and out-of-order. In-order completion means no instruction can complete before all instructions dispatched ahead of it have been completed. Out-of-order completion means that an instruction is allowed to complete before all instructions ahead of it have been completed, as long as a predefined rules are satisfied. Within a pipeline superscalar processor, instructions are first fetched, decoded and then buffered. Instructions can be dispatched to execution units as resources and operands become available. Additionally, instructions can be fetched and dispatched speculatively based on predictions about branches taken. The result is a pool of instructions in varying stages of execution, none of which have completed by writing final results. As resources become available and branches are resolved, the instructions are "retired" in program order thus preserving the appearance of a machine that executes the instructions in program order.

A superscalar processor tracks, or manages, instructions that have been speculatively executed typically utilizing a completion buffer. Each executed instruction in the buffer is associated with its results generally stored in renamed registers and any exception flags. A problem arises, however, when instructions are executed out of order and in particular when one of the instructions encounters an error condition. The processor must stop at the instruction that has an error because that instruction may affect subsequent instructions and the machine state.

For both in-order and out-of-order completion of instructions in superscalar systems, these pipelines stop and stall under certain circumstances. An instruction that is dependent upon the results of a previously dispatched instruction that has not yet completed may cause the pipeline to stall. For instance, instructions dependent on a load/store instruction in which the necessary data is not in the cache, i.e., a cache miss, cannot be completed until the data becomes available in the cache.

Another technique called hardware multithreading is to independently execute smaller sequences of instructions called threads or contexts in a single processor. When a CPU, for any of a number of reasons, stalls and cannot continue processing or executing one of these threads, the CPU switches to and executes another thread. The term "multithreading" as defined in the computer architecture community is not the same as the software use of the term in which one task is subdivided into multiple related threads. Software multithreading substantially involves the operating system which manipulates and saves data from registers to main memory and maintains the program order of related and dependent instructions before a thread switch can occur. Software multithreading does not require nor is it concerned with hardware multithreading and vice versa. Hardware multithreading manipulates hardware architected registers and execution units and pipelined processors to maintain the state of one or more independently executing sets of instructions, called threads, in the processor hardware. Threads could be derived from, for example, different tasks in a multitasking system, different threads compiled from a software multithreading system, or from different I/O processors. What makes hardware multithreading unique and different from all these systems, however, is that more than one thread is independently maintained in a processor's registers.

Hardware multithreading takes on a myriad of forms. Multithreading permits processors having either non-pipeline or pipelined architectures to do useful work on more than one thread in the processor's registers. One form of multithreading, sometimes referred to as coarse-grained multithreading, is to execute one thread until the executing thread experiences a long latency event, such as retrieving data and/or instructions from memory or a processor interrupt, etc. Fine-grained multithreading, on the other hand, interleaves or switches threads on a cycle-by-cycle basis. Simultaneous hardware multithreading maintains N threads, or N states, in parallel in the processor and simultaneously executes N threads in parallel. Replicating processor registers for each of N threads results in some of the following registers being replicated N times: general purpose registers, floating point registers, condition registers, floating point status and control registers, count registers, link registers, exception registers, save/restore registers, special purpose registers, etc. Special buffers, such as a segment lookaside buffer, may be replicated but if not; each entry can be tagged with the thread number and flushed on every thread switch. Also, some branch prediction mechanisms, e.g., the correlation register and the return stack, may also be replicated. Multithreading may also take on features of one or all of the forms, picking and choosing particular features for particular attributes, for instance, not all of the processor's features need be replicated for each thread and there may be some shared and some replicated registers and/or there may be some separate parallel stages in the pipeline or there may be other shared stages of the pipeline. Fortunately, there is no need to replicate some of the larger functions of the processor such as: level one instruction cache, level one data cache, instruction buffer, store queue, instruction dispatcher, functional or execution units, pipelines, translation lookaside buffer (TLB), and branch history table. A problem exists, however, when there are separate or private queues or other resources and the processor has some shared pipeline stages; thus, when an instruction stalls at the shared stage, not only does its thread stall at that shared stage but also other threads in or after the shared stage are also stalled and cannot execute.

There is thus a need in the industry to enhance simultaneous multithreading by efficiently flushing a stalled thread in shared and earlier pipeline stages of a multithread processor.

SUMMARY OF THE INVENTION

These needs and others that will become apparent to one skilled in the art are satisfied by a method to flush one of a plurality of threads in a processor pipeline of a multi-threaded computer processor, comprising the steps of: (a) fetching a plurality of threads for simultaneous processing in the multithread processor having at least one shared pipeline stage; (b) recognizing a stalled instruction in the shared pipeline stage which prevents further processing of at least two threads present in the processor pipeline in which the stalled instruction belongs to one of the threads present in the processor pipeline of the processor pipeline, (c) flushing all instructions of the one thread having the stalled instruction from the shared pipeline stage and all stages in the processor pipeline prior to the shared pipeline stage; and (d) processing another of the threads in the processor pipeline. The stalled instruction may be stalled because a private resource required by the stalled thread is blocked. The instruction may be stalled because a non-renamed register needed by the stalled instruction is blocked. The stalled instruction may be an instruction requiring synchronized load/storage operations and the operations are delayed. The stalled instruction may be a first instruction of a group of microcoded instructions.

The method may further comprise determining if any other instructions associated with the thread having the stalled instruction has any other associated flush conditions. The method may further comprise determining if the stalled instruction of the one of a plurality of threads or the other instruction having an associated flush condition should be flushed first; and first flushing the other instruction having the associated flush condition and in accordance with the associated flush condition because the other instruction is older.

The method also encompasses that the shared pipeline stage is a dispatch stage. Under these circumstances, the method may also comprise removing the instructions of the thread associated with the stalled instruction from a decode pipeline. The method may also comprise removing the instructions of the thread associated with the stalled instruction from an instruction buffer. The method may also comprise restarting the thread whose instructions were flushed from the dispatch stages and all stages in the processor pipeline prior to the dispatch stage. The step of restarting may be delayed until a condition which causes the stalled instruction to stall at the dispatch stage is resolved. The step of restarting the flushed thread may also be delayed until a number of the processor cycles have passed.

The invention may further be considered a dispatch flush mechanism in a hardware multithread pipeline processor, the pipeline processor simultaneously processing more than one thread, the dispatch flush mechanism comprising: a fetch stage of the pipeline processor; a decode stage of the pipeline processor connected to the fetch stage; a dispatch stage of the pipeline processor connected to the decode stage; flush prioritize logic connected to the fetch stage, the decode stage, and the dispatch stage of the pipeline processor; an issue queue of the pipeline processor connected to the dispatch stage; a plurality of private resources dedicated to each of the threads connected to the issue queue; and thread select logic within the pipeline processor, wherein one of the plurality of instructions of one of the plurality of threads is prevented from dispatching into an issue queue because one of the plurality of private resources is unavailable and wherein the thread select logic selects all instructions in the dispatch stage, the decode stage, and the fetch stage belonging to the one of the plurality of threads and the flush prioritize logic issues a signal to remove the all instructions.

The invention is also considered an apparatus to enhance processor efficiency, comprising: means to fetch instructions from a plurality of threads into a hardware multithreaded pipeline processor; means to distinguish the instructions into one of a plurality of threads; means to decode the instructions; means to determine if the instructions have sufficient private and shared resources for dispatching the instructions; and means to dispatch the instructions; means to remove all of the instructions of the one of the plurality of threads from the fetching means and the decoding means and the dispatching means when the determining means determines that one of the instructions of the one of a the plurality of threads does not have sufficient private resources for the dispatch means to dispatch the instruction.

The invention is also a computer processing system, comprising a central processing unit; a semiconductor memory unit attached to the central processing unit; at least one memory drive capable of having removable memory; a keyboard/pointing device controller attached to the central processing unit for attachment to a keyboard and/or a pointing device for a user to interact with the computer processing system; a plurality of adapters connected to the central processing unit to connect to at least one input/output device for purposes of communicating with other computers, networks, peripheral devices, and display devices; and a hardware multithreading pipelined processor within the central processing unit to process at least two independent threads of execution. The hardware multithreading pipelined processor comprises a fetch stage, a decode stage, and a dispatch stage; an instruction stall detector to detect when a resource required in the dispatch stage by an instruction of one of the threads is unavailable and hence the instruction is stalled in the dispatch stage; flush decode logic to determine if the thread having the stalled instruction has a previous flush condition, a dispatch flush mechanism to flush the thread having the stalled instruction from the fetch stage, the decode stage, and the dispatch stage if no other previous flush condition exists or if the previous flush condition has a lower priority than the stalled instruction so that the processor can process another of the independent threads of execution with the processor pipeline.

The invention is best understood with reference the Drawing and the detailed description of the invention which follows.

DETAILED DESCRIPTION OF THE INVENTION

Figure 1:
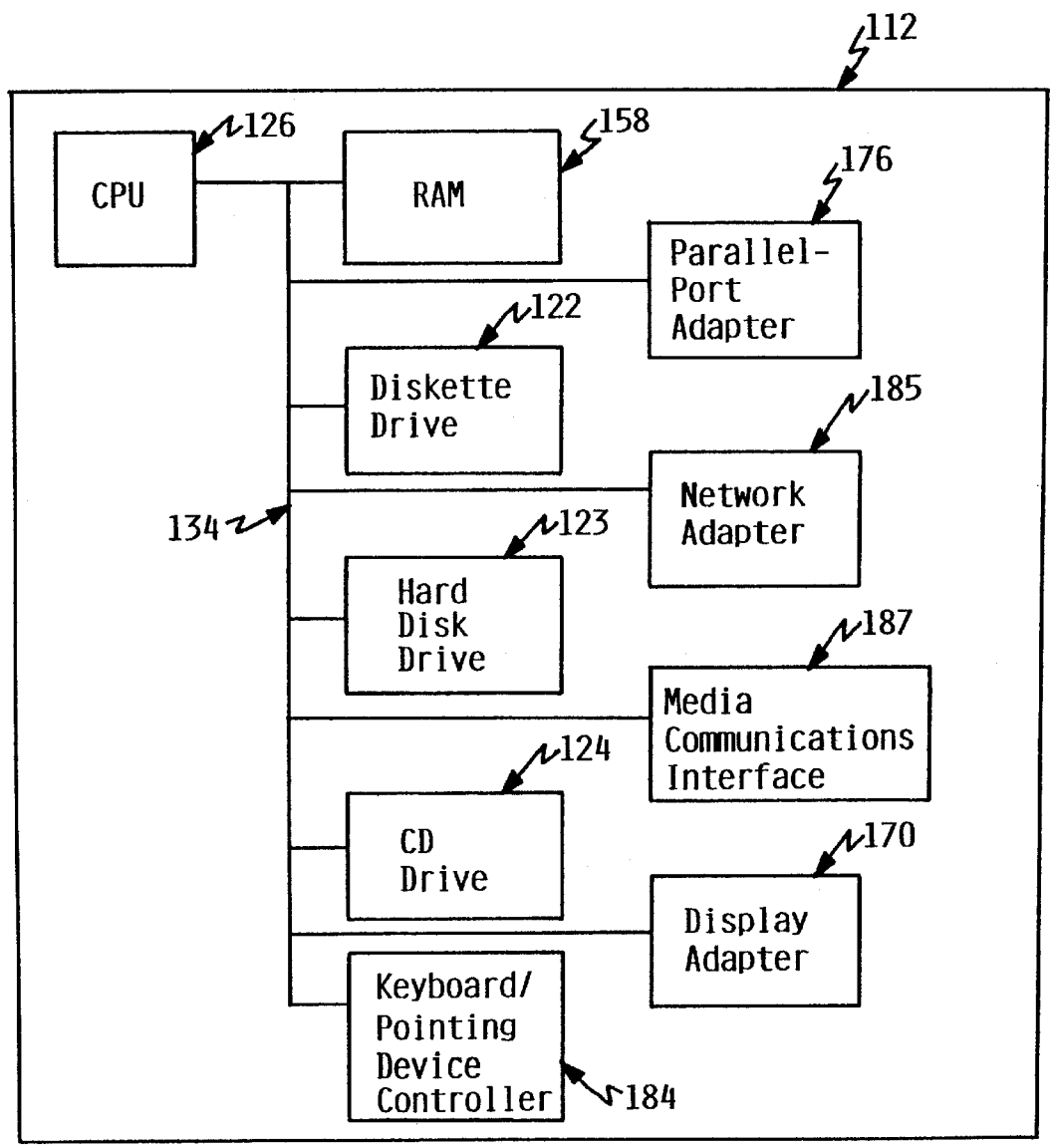
FIG. 1 is a simplified block diagram of a computer that can be used in accordance with an embodiment of the invention.

Referring now to the Drawing wherein like numerals refer to the same or similar elements throughout and in particular with reference to FIG. 1, there is depicted a block diagram of the principal components of processing unit 112, central processing unit (CPU) 126 is connected via system bus 134 to RAM 158, diskette drive 122, hard-disk drive 123, CD drive 124, keyboard/pointing-device controller 184, parallel-port adapter 176, network adapter 185, display adapter 170 and media communications adapter 187. Internal communications bus 134 supports transfer of data, commands and other information between different devices; while shown in simplified form as a single bus, it is typically structured as multiple buses; and may be arranged in a hierarchical form.

CPU 126 is a general-purpose programmable multithread processor, executing instructions stored in memory 158. While a single CPU having multithread capabilities is shown in FIG. 1, it should be understood that computer systems having multiple CPUs, some of which may not have multithread capabilities, are common in servers and can be used in accordance with principles of the invention so long as one CPU has multithreading capabilities. Although the other various components of FIG. 1 are drawn as single entities, it is also more common that each consist of a plurality of entities and exist at multiple levels. While any appropriate multithread processor can be utilized for CPU 126, it is preferably one of the PowerPC™ line of microprocessors available from IBM having multithreading performance. CPU 126 accesses data and instructions from and stores data to volatile random access memory (RAM) 158. CPU is suitably programmed to carry out the preferred embodiment as described in more detail in the flowcharts of FIGS.

Memory 158 is a random-access semiconductor memory (RAM) for storing data and programs; memory is shown conceptually as a single monolithic entity, it being understood that memory is often arranged in a hierarchy of caches and other memory devices. RAM 158 typically comprises a number of individual volatile memory modules that store segments of operating system and application software while power is supplied to processing unit 112. The software segments may be partitioned into one or more virtual memory pages that each contain a uniform number of virtual memory addresses. When the execution of software requires more pages of virtual memory than can be stored within RAM 158, pages that are not currently needed are swapped with the required pages, which are stored within non-volatile storage devices 122, 123, or 124. Data storage 123 and 124 preferably comprise one or more rotating magnetic or optical hard disk drive units, although other types of data storage could be used.

Keyboard/pointing-device controller 184 interfaces processing unit 112 with a keyboard and graphical pointing device. In an alternative embodiment, there may be a separate controller for the keyboard and the graphical pointing device. Display device adapter 170 translates graphics data from CPU 126 into video signals utilized to drive a display device. Device adapter 170 may support the attachment of a single or multiple terminals, and may be implemented as one or multiple electronic circuit cards or other units.

Processing unit 112 may include network-adapter 185, media communications interface 187, and parallel-port adapter 176, all of which facilitate communication between processing unit 112 and peripheral devices or other data processing system. Parallel port adapter 176 may transmit printer-control signals to a printer through a parallel port. Network-adapter 185 may connect processing unit 112 to a local area network (LAN). A LAN provides a user of processing unit 112 with a means of electronically communicating information, including software, with a remote computer or a network logical storage device. In addition, a LAN supports distributed processing which enables processing unit 112 to share a task with other data processing systems linked to the LAN. For example, processing unit 112 may be connected to a local server computer system via a LAN using an Ethernet, Token Ring, or other protocol, the server in turn being connected to the Internet. Media communications interface 187 may comprise a modem connected to a telephone line through which an Internet access provider or on-line service provider is reached. Increasingly, however, other higher bandwidth interfaces are implemented so media communications interface 187 may also interface with cable television, wireless communications, or high bandwidth communications lines and other types of connection. An on-line service may provide software that can be downloaded into processing unit 112 via media communications interface 187. Furthermore, through the media communications interface 187, processing unit 112 can access other sources of software such as a server, electronic mail, or an electronic bulletin board, and the Internet or world wide web.

Figure 2A:
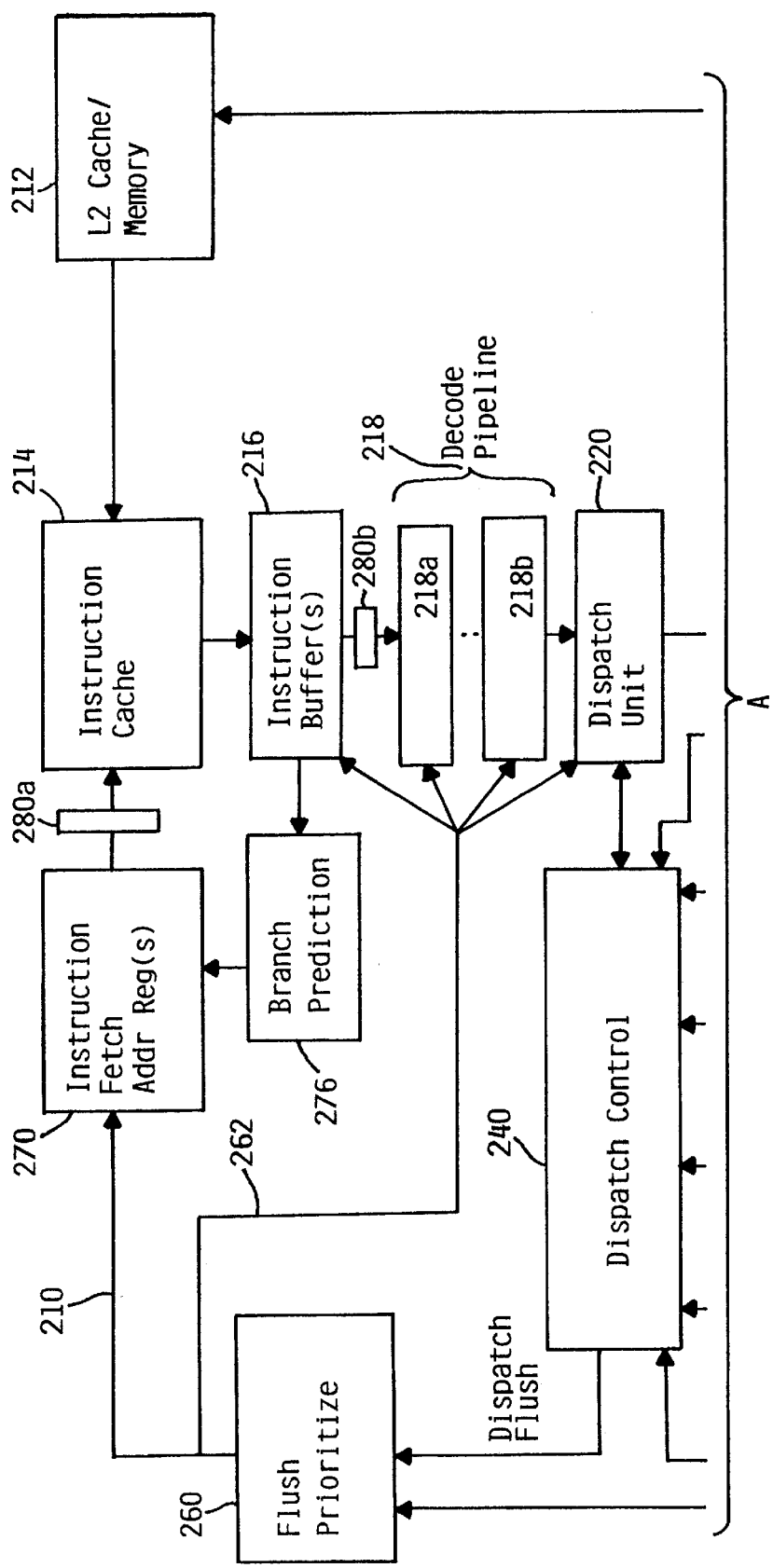
FIG. 2 is a simplified block diagram of a computer processing unit having various pipelines, registers, and execution units that can take advantage of the dispatch flush feature of a preferred embodiment of the invention.
Figure 2B:
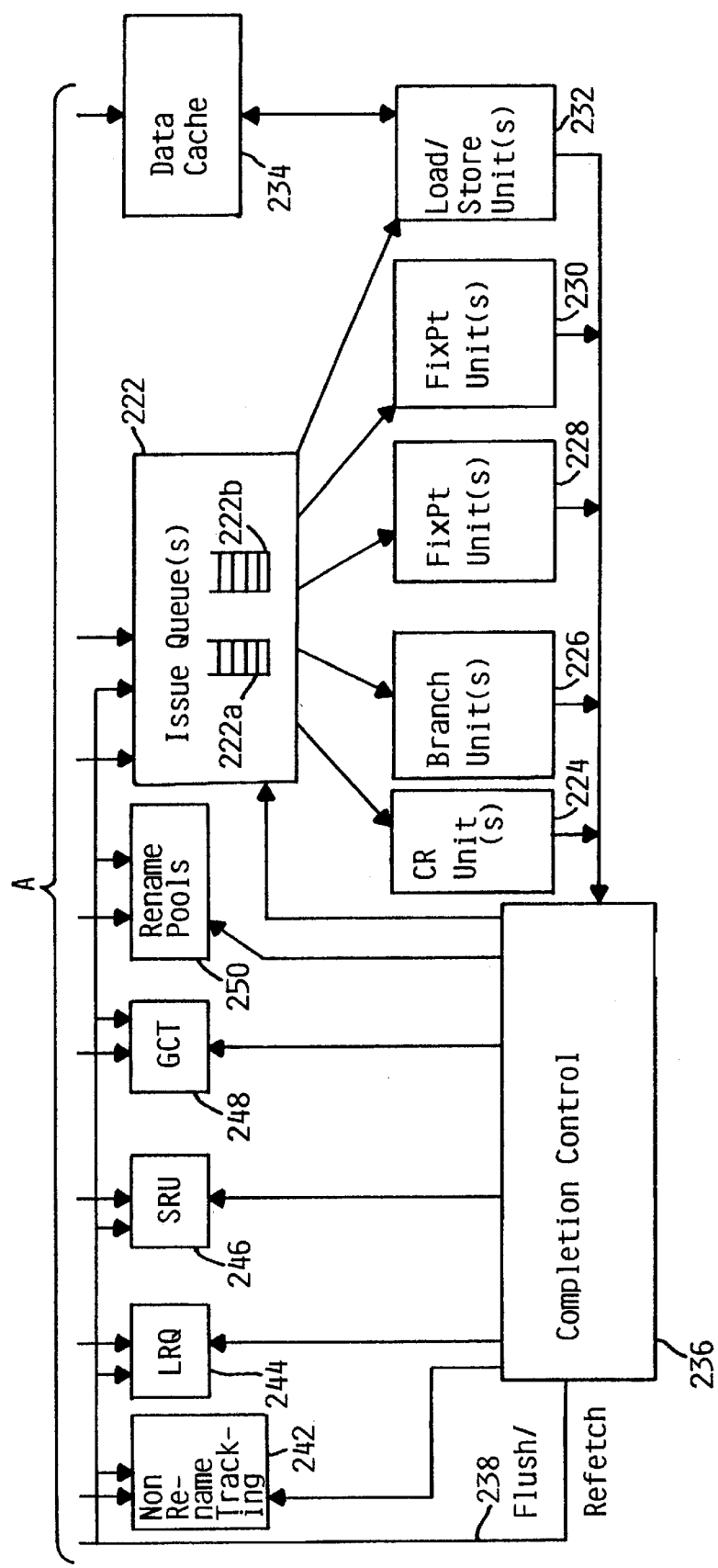

Shown in FIG. 2 is a multithread computer processor architecture 210 in accordance with a preferred implementation of the invention. Illustrated is an out-of-order pipelined processor such as that disclosed in "System and Method for Dispatching Groups of Instructions", U.S. Ser. No. 108,160 filed Jun. 30 1998; now U.S. Pat. No. 6,324,640 issued on Nov. 27, 2001 "System and Method for Permitting Out-of-Order Execution of Load Instructions", U.S. Ser. No. 213,323 filed Dec. 16, 1998; now U.S. Pat. No. 6,266,768, issued on Jul. 24, 2001 "System and Method for Permitting Out-of-Order Execution of Load and Store Instructions", U.S. Ser. No. 213,331 filed Dec. 16, 1998; now U.S. Pat. No. 6,301,654 issued Oct. 9, 2001 "Method and System for Restoring a Processor State Within a Data Processing System in which Instructions are Tracked in Groups", U.S. Ser. No. 332,413 filed Jul. 14, 1999; and "System and Method for Managing the Execution of Instruction Groups Having Multiple Executable Instructions", U.S. Ser. No. 434,095 filed Nov. 5, 1999, now U.S. Pat. No. 6,553,480 issued on Apr. 22, 2003 all these patent applications being commonly owned by the assignee herein and which are hereby incorporated by reference in their entireties.

The processor as disclosed in the above incorporated applications has been modified as described below to enable simultaneous hardware multithreading operations. Multithreading operations in the context of the invention means hardware multithreading in which sequences of instructions, i.e., threads, execute independently from other threads, and in which hardware architected registers, execution units, and pipelined processors maintain the state of one or more independently executing sets of instructions, called threads, in the processor hardware. With simultaneous multithreading, two or more threads are simultaneously active in the processor's pipeline. Thus, the processors' pipeline(s) are able to perform useful work on different threads when a pipeline stall condition is detected for one thread. Furthermore, while one embodiment of the invention will be described in the context of dual multithreading operations in which only two threads are in the processor's pipeline and registers at any one time, the principles and context of the dispatch flush feature of the invention pertain to having more than two threads in different stages of the processor's pipeline and the architected registers. One of skill in the art will appreciate, moreover, that multithread pipelined processor architectures not having out-of-order execution or the particular sets of registers and queues as described in the incorporated patent applications can also take advantage of the dispatch flush feature of the present invention.

The block diagram of a multithread pipeline processor of FIG. 2 is greatly simplified; many connections and control lines between the various elements have been omitted for purposes of facilitating understanding of the dispatch flush feature in accordance with principles of the invention. Referring now to FIG. 2 and the instruction cache 214 at the top center of the figure, instructions for the threads in the pipeline are fetched into the instruction cache 214 from a L2 cache or main memory 212. While the L2 cache and main memory 212 have been simplified as a single unit, in reality they are separated from each by a system bus and there may be intermediate caches between the L2 cache and main memory and/or between the L2 cache and the instruction cache 214. Address tracking and control to the instruction cache 214 is provided by the instruction fetch address register 270 having at least one address, possibly more, per thread. A thread select 280*a* may be interposed between the instruction fetch address register 270 and the instruction cache 214 for selection of a particular thread pertaining to particular address(es). From the instruction cache 214, the instructions are forwarded to the instruction buffers 216 in which evaluation of branch conditions occurs in conjunction with the branch prediction logic 276. Instruction buffers 216 also receive input control signals from the flush prioritize logic 260 to determine which instructions, if any, are associated with a thread to be flushed in accordance with the dispatch flush feature of the invention. In a preferred embodiment of the instruction buffers 216, instructions of each thread are distinguishable from instructions of other threads. A second thread select 280b can select instructions for a particular thread to be output to the decode unit 218. In accordance with the dispatch flush feature of the invention, instructions are flushed from the instruction buffers 216, and any conditions in the branch prediction 276, and addresses in the instruction fetch address register 270 associated with the flushed instructions are also flushed.

The decode unit 218 may require multiple cycles to complete its function and accordingly, may have multiple pipelines 218a, 218b, etc. Preferably each stage 218a and stage 218b has distinct threads. In the decode unit 218, complex instructions may be simplified or represented in a different form for easier processing by subsequent processor pipeline stages. Other events that may occur in the decode unit 218 include the reshuffling or expansion of bits in instruction fields, extraction of information from various fields for, e.g., branch prediction or creating groups of instructions. Some instructions, such as load multiple or store multiple instructions, are very complex and are more processed by breaking the instruction into a series of simpler operations or instructions, called microcode. During decode, these complex instructions are decoded into the microcode and all of the simpler instructions comprising the complex instruction are tracked as a group. The decode unit 218 also receives control signals from the flush prioritize logic 260 to determine where to flush the pipeline if more than flush for the same thread is indicated at different stages of the pipeline. In accordance with the dispatch flush feature of the invention, instructions associated with a stalled thread are flushed from the decode unit 218, as described below.

From the decode unit 218, instructions are forwarded to the dispatch unit 220. The dispatch unit 220 may receive control signals from the dispatch control 240 in accordance with the referenced applications and from the flush prioritize logic 260. At the dispatch unit 220 of the processor pipeline, all resources, queues, and renamed pools are checked to determine if they are available for the instructions within the dispatch unit 220. Different instructions have different requirements and all of those requirements must be met before the instruction is dispatched beyond the dispatch unit 220. The dispatch control 240 and the dispatch unit 220 controls the dispatch of microcoded or other complex instructions that have been decoded into a multitude of simpler instructions, as described above. The processor pipeline, in one embodiment, typically will not dispatch in the middle of a microcoded instruction group; the first instruction of the microcode must be dispatched successfully and the subsequent instructions are dispatched in order. A multithread embodiment of the invention may presume that during any given processor clock cycle an instruction from only one thread is dispatched from the dispatch unit 220 to the issue queues 222. In accordance with the dispatch flush feature of the invention, instructions of a stalled thread are flushed from the dispatch unit 220.

From the dispatch unit 220, instructions enter the issue queues 222. There may be multiple issue queues 222a and 222b and more than one thread may be present in each issue queue 222a, 222b, or there may be one issue queue per thread depending upon choice of architecture. The issue queues 222 may receive control signals from the completion control logic 236, from the 485 dispatch control 240, and from a combination of various queues which may include, but which are not limited to, a non-renamed register tracking mechanism 242, a load reorder queue (LRQ) 244, a store reorder queue (SRQ) 246, a global completion table (GCT) 248, and a rename pools 250. The LRQ 244, the SRQ 246, and/or the GCT 248 may be split between threads, may be shared amongst the threads; or separate queues may exist for each thread as will be discussed in the context of separate or shared resources below. For tracking purposes, instructions may be tracked singly or in groups in the GCT 248 to maintain the order of instructions. The LRQ 244 and the SRQ 246 may maintain the order of the load and store instructions, respectively, as well as maintaining addresses for the program order. The non-renamed register tracking mechanism 242 may track instructions in such registers as special purpose registers, etc. The instructions are dispatched on yet another machine cycle to the designated execution unit which may be one or more condition register units 224, branch units 226, fixed point units 228, floating point units 230, or load/store units 232 which load and store data from and to the data cache 234.

The successful completion of execution of an instruction or, on the other hand, mispredicted branches or notification of errors which may have occurred in the execution units are forwarded to the completion control logic 236, which may generate and transmit a flush/refetch signal 238 to the flush prioritize logic 260 and any of a plurality of queues, the non-renamed register tracking mechanism 242, the LRQ 244, the SRQ 246, the GCT 248, or the renamed pools 250.

Some of the reasons an instruction may stall at the dispatch unit 220 include the instruction tracking queues being blocked, such as being full or otherwise unavailable to the instruction, a sync instruction being unable to execute, resources required by the instruction being blocked as in being full or otherwise unavailable, moving a thread state to/from non-renamed registers, etc. If either a dedicated LRQ 244 or dedicated SRQ 246 or dedicated GCT 248 is blocked, then the pipeline stalls behind these queues. If there are insufficient renamed pools 250 available, the pipeline stalls. Non-renamed registers may also stall the processor pipeline if some process is serialized on data or other required resource that is not renamed, e.g., Q1 must occur before Q2. In some instances, issue queues 222 may be full and/or waiting for operands to proceed and the pipeline stalls. One of the simpler instructions of a group derived from a multiple or complex instruction may stall in the dispatch stage. A sync and/or other instructions that synchronize and access storage in out-of-order processors may stall the pipeline because it needs additional information or because it must wait at dispatch stage because of downstream activity of its own thread such as clearing out a LRQ 244 or a SRQ 246. The dispatch flush aspect of the invention applies to any condition that causes a processor's pipeline to stall at dispatch when the condition causing the stall is specific to a thread.

With respect to the threads, there may be private or separate resources, or shared resources. Some private resources are registers or queues dedicated for the exclusive use of a particular thread. There may be one queue per thread or each queue may be split having reserved spaces for each thread. Examples of private resources may include the non-renamed register tracking queue 242, issue queues 222, LRQ 244, SRQ 246, GCT 248, and register renamed pools 250. Private resources simplify the management in that pointers from different threads address different data structures and may permit advantageous placement of the queues in different parts of the chip. To guarantee correct ordering of instructions for some architected non-renamed registers, such as some special purpose registers, one method is to stall an instruction at the dispatch stage to wait for a previous instruction to write data into the non-renamed register that will be subsequently required by the stalled instruction. Some implementations may choose to track read/writes of multiple non-renamed registers as a single entity. In those instances, the tracking mechanism of the non-renamed registers 242 is preferably considered a private resource. Similarly, a sync instruction of a particular thread when stalled at the dispatch unit 220 because it is waiting for activity downstream of its own thread in the pipeline may also be considered a private resource.

On the other hand, though, separate data structures are not as efficient as a shared structure because the partition between structures is fixed although the need for various registers are dynamic. Thus, the invention further contemplates that the data structures and registers may also be architected as shared resources. Shared resources are those processor registers and queues which can be shared by either thread either separately or at the same time. In some circumstances, the non-renamed tracking register 242, the LRQ 244, the SRQ 246, the GCT 248, the register renamed pools 250, and the issue queues 222 may be shared amongst threads. Some resources may be shared while others may be private, e.g., the GCT 326 may be shared while the LRQ 244 and the SRQ 246 may be private.

In accordance with a preferred embodiment of the invention, the use of private resources and a new mechanism called a "dispatch flush" yields performance benefits similar to the shared queue structure without increasing the chip area over the shared queue case. Whenever an instruction is stalled meaning that it cannot proceed further down the pipeline because a private resource is blocked, meaning that the instruction cannot access that resource, a dispatch flush of the thread having that instruction occurs in accordance with the invention. The dispatch flush causes that thread having an instruction that is stalled at the dispatch unit 220 to be flushed from the instruction fetch and decode portions of the pipeline and all other portions of the processor's pipeline up to and including the dispatch unit 220. A flush control signal 262 causes both a dispatch flush and a normal flush/refetch 238 to flush instructions of a particular thread from the dispatch unit 220 and earlier pipeline stages. The dispatch flush, however, allows other thread(s) to proceed and, unlike the normal flush/refetch, permits continued execution of instructions in the issue queues 222. One of ordinary skill in the art will recognize that the flush feature of the invention applies to any stage in a multithread pipeline process that is shared amongst the threads in the pipeline which does not provide a bypass queue or other bypass mechanism. That the shared stage is the dispatch stage in the preferred embodiment is to be taken by way of example only and is not to be considered limiting.

No dispatch flush is performed, however, if the thread is stalled because of a shared resource, such as register renamed pool, is full or otherwise blocked. Under these circumstances all threads are blocked and either a normal flush would occur or the processor would wait until the stalling condition is resolved. No dispatch flush is performed when the stalled instruction is of a group of instructions generated from a decoded multiple or more complex instruction but the stalled instruction is not the first of the group.

Figure 3A:
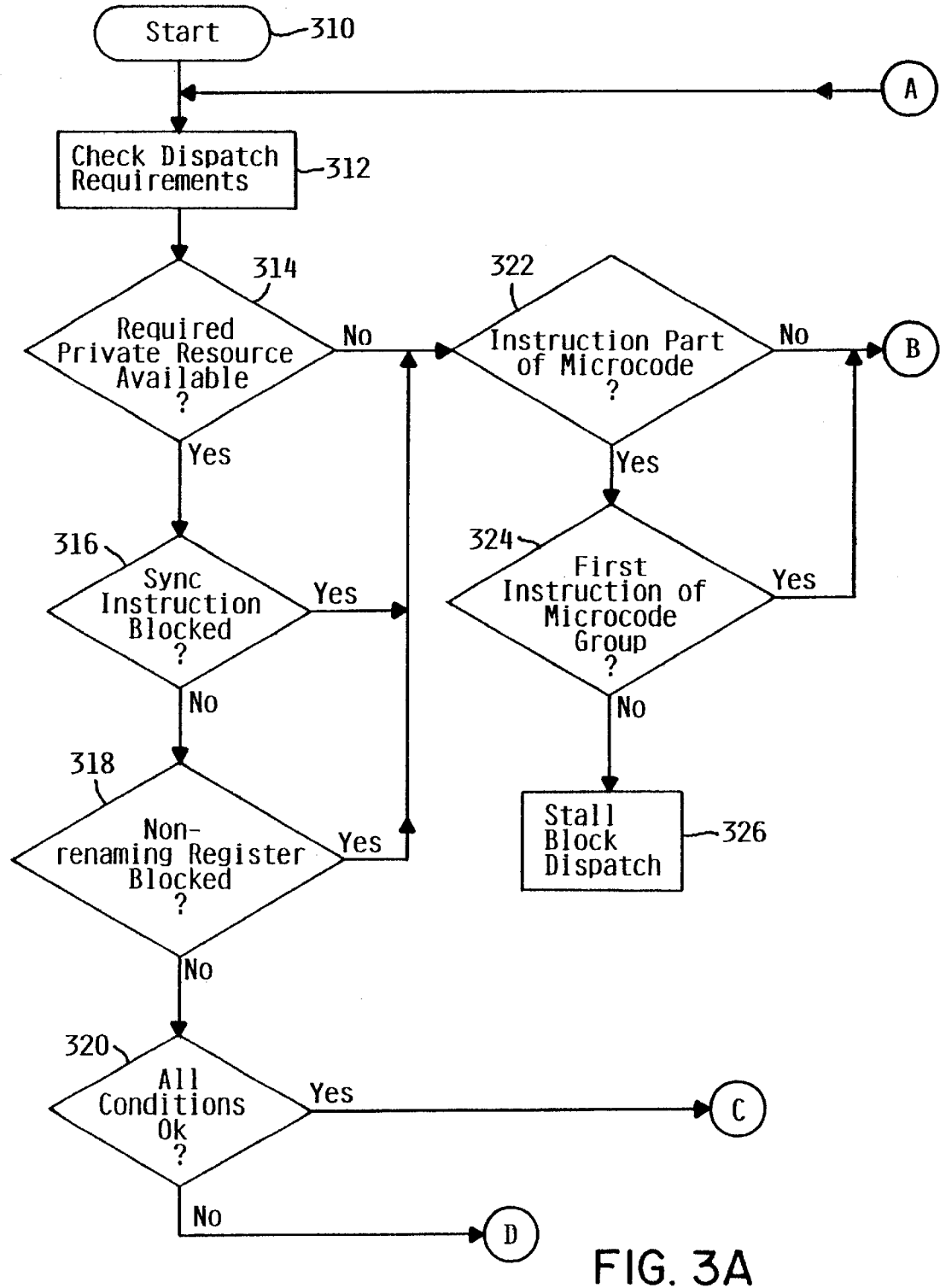
FIG. 3 is a simplified flow chart of the dispatch flush feature of an embodiment of the invention.
Figure 3B:
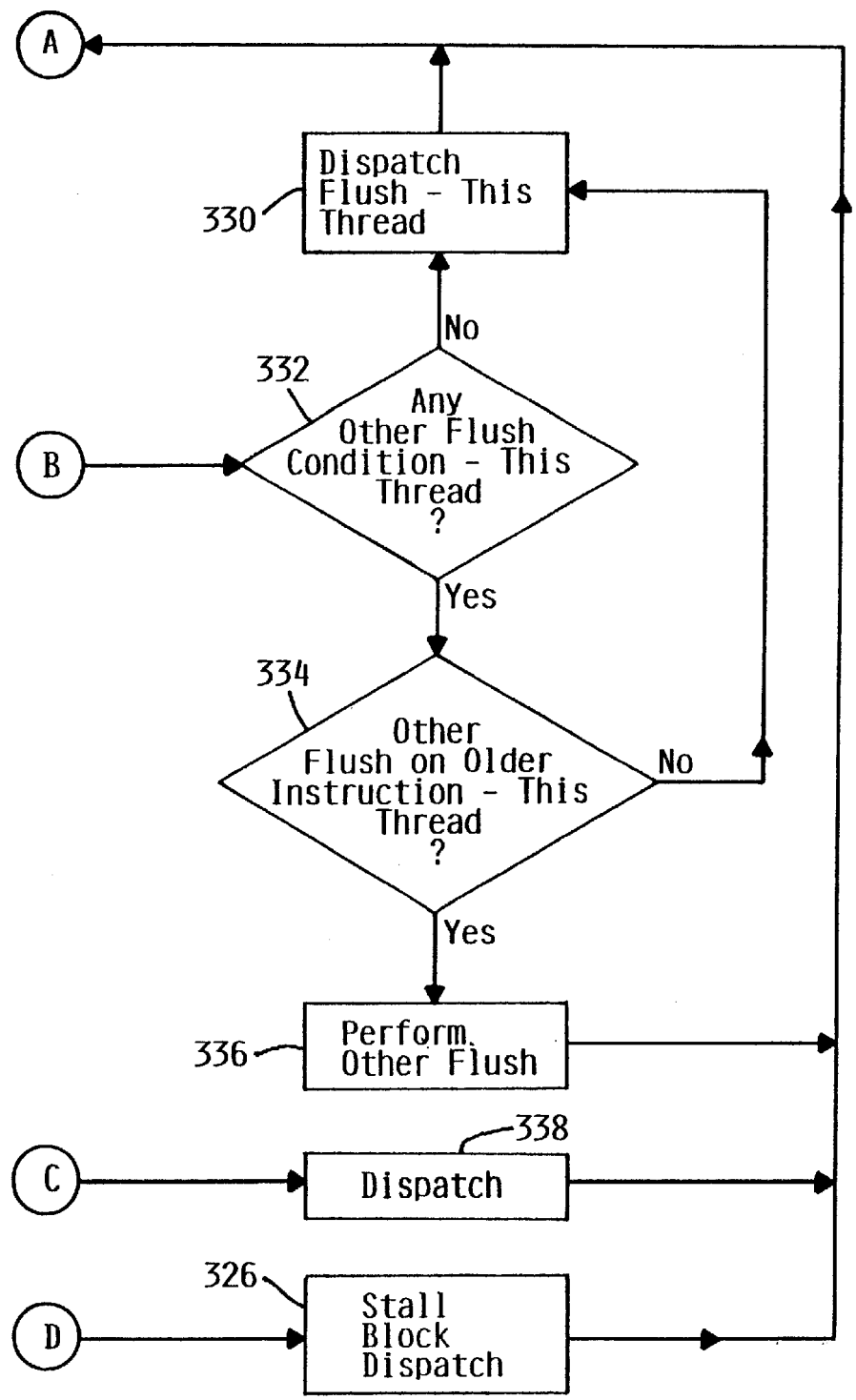

FIG. 3 is a simplified flow chart of the dispatch flush mechanism and method preferably embodied in the dispatch control logic 240. At step 310, an instruction is in the dispatch stage 220 and the requirements for dispatch are checked in step 312. One of these requirements is further delineated in step 314 which determines if all the required private resources are available. In the processor architecture of FIG. 2, these private resources may include dedicated or split LRQ 244, dedicated or split SRQ 246, dedicated or split GCT 248, or other registers and resources uniquely allocated to the thread. If the private resources are available, the logic interrogates the state of the machine to determine if a sync instruction is blocked, as in step 316. If a sync instruction is not blocked, then the dispatch control 240 checks to see if a non-renamed register, such as a special purpose registers or other infrequently used registers, is blocked as in step 318.

If, however, the private or dedicated resources are not available as in step 314, or if the sync instruction is blocked as in step 316, or if a special purpose or other non-renamed register is blocked as in step 318, then the process determines that a stall condition exists. The process then inquires in step 322 if the stalled instruction is one of microcode. If so, then preferably, the instruction must be the first instruction in a group of microcoded or multiple instructions, as in step 324 before other dispatch flush conditions are evaluated in the dispatch flush prioritize logic 260, as in step 332. If, however, the instruction is part of microcode but is not the first of a group, as determined in steps 322 and 324, then the processor pipeline stalls at the dispatch stage, as in step 326.

If all private resources as required by the processor's hardware architecture are available and if, as in step 320, all other conditions, such as a shared queue determines that the instruction is ready for execution, the instruction is dispatched to the issue queues as in step 338. If, however, any of the above conditions are not satisfied, i.e., a private resource is not available (step 314) or a sync instruction is blocked (step 316) or a non-renamed register is blocked (step 318) or another condition is unsatisfactory (step 320), a stall condition exists and further execution of the thread is blocked as in step 326 until the condition resolves itself.

The dispatch prioritize logic 260, as in step 332, determines if any other flush conditions, such as a flush/refetch signal, or a branch mispredict, or any other architected flush mechanisms are enabled for the thread having the stalled instruction. If other flush conditions exist, then prioritization by the flush prioritize logic 260 also participates in step 334 to determine if the other flush condition exists for an older instruction of the same thread. If there is another flush condition pending that thread, then, in step 336, the instructions of the same thread are flushed according to the priority scheme established for flush conditions. If no older instruction has a flush condition or if no other priority scheme determines that another instruction of the same thread does not have priority, as in step 334 or if there are no other flush conditions associated with the thread as in step 332, a dispatch flush of step 330 is performed.

As discussed earlier, a dispatch flush removes or flushes the stalled instruction and subsequent instructions of the same thread from the dispatch stage and any and all registers and processor stages from earlier stages of the processor's pipeline, e.g., that instruction and subsequent instructions of the stalled thread are removed from the dispatch unit 220, from the decode unit 218, from the instruction buffers 216, from the branch prediction 276 and the addresses are cleared from the instruction fetch address registers 270. The thread will then have to be refetched at the oldest flushed instruction and the addresses in the instruction fetch address register, in the branch prediction registers, and the state of any other pertinent architected registers for that thread will have to be restored.

After a thread has been dispatch-flushed and is restored, it reenters the pipeline as normal. Should it again encounter the dispatch block or a different block, the dispatch flush can occur again. A dispatch block caused by a sync instruction, an L2 cache miss, or other long latency event for a thread may last a long time so the restart of the stalled thread could be delayed, thereby giving more cycles to the other threads. In any event, it may be preferable to refrain from fetching or decoding the stalled thread again at the thread select locations 280*a*, 280*b* until, e.g., the stalled condition resolves itself or until a predetermined number of machine cycles has passed.

The table below compares the performance gained in a simultaneous multithread (SMT) processor having split or private queues in conjunction with using the dispatch flush feature.

|  | SMT performance gain | SMT core area increase |
|---|---|---|
| Shared queues | 35% | 10% |
| Private queues, 1x total entries | 27% | 10% |
| Private queues, 2x total entries | 36% | 25% |
| Private queues, 2x total entries, dispatch flush | 41% | 25% |
| Private queues, 1x total entries, dispatch flush | 37% | 10% |

In the first case, with shared queues there is a thirty-five percent performance gain with two threads over a single-threaded design. The area cost is ten percent of the processor core excluding any L2 and L3 caches. If the queues are simply split between threads so that the area is held constant, the performance drops dramatically because of inflexible partitioning of the queues. The original performance gain can be achieved with larger queues but the area increases. More queue entries adds some bits to the data structures to identify threads but resulting in a greater than linear area increase. With the addition of dispatch flush, performance is moderately increased, but importantly, the core area decreases significantly.

Unlike an existing flush mechanisms, such as used for recovering from incorrect branch predictions, the dispatch flush prevents a stalled thread from even entering the issue queues and thus, less resources have to be flushed and recovery is faster. In contrast to a dispatch flush, given a branch instruction, a branch will predict the target and retrieve the target to be the next instruction in the decode pipeline. Thus, the branch and the predicted instructions are pipelined all the way into the issue queues. But because the branch executes and was determined to be the wrong path, a signal is generated and sent to the GCT or other instruction tracking queues so that all the instructions for the entire group are flushed, i.e., the issue queues, the LRQ, the SRQ, the GCT or other instruction tracking and completion table, the renamed pools, the instruction buffer, the decode pipeline, and the dispatch pipeline—all instructions associated with that thread are flushed and new instructions are fetched. Another difference between a dispatch flush and a normal flush is that the instructions at the dispatch stage do not have a GCT entry so the GCT need not be flushed. The dispatch flush, moreover, is cheaper in that only the fetch/decode/dispatch part of the pipeline is flushed.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

What is claimed is:

1. A method to flush one of a plurality of threads in a processor pipeline of a multithread computer processor, the method comprising the steps of:
   (a) fetching said plurality of threads for simultaneous processing in said multithread computer processor, said processor having at least one shared pipeline stage, and said plurality of threads having shared hardware resources and each of said plurality of threads having its respective private hardware resources, said shared and private hardware resources downstream from said at least one shared pipeline stage;
   (b) recognizing a stalled condition exists in a private hardware resource downstream from said shared pipeline stage, said stalled condition preventing further processing of one of said plurality of threads requiring its respective private hardware resource;
   (c) flushing all instructions of said one of said at least two threads having said stalled condition in its respective private resource from said shared pipeline stage and all stages in said processor pipeline prior to said shared pipeline stage; and
   (d) processing another of said at least two threads in said processor pipeline.

2. The method of claim 1, wherein said stalled condition results because a non-renamed register needed downstream by its respective one of said plurality of threads is blocked.

3. The method of claim 1, wherein said stalled condition results from an instruction requiring synchronized load/storage operations and said operations are delayed.

4. The method of claim 1, further comprising:
   (a) determining that said stalled condition results a first instruction of a group of microcoded instructions being stalled.

5. The method of claim 1, further comprising:
   (a) determining if any other instructions associated with said one thread having a stalled condition has any other associated flush conditions.

6. The method of claim 5, further comprising:
   (a) determining if said other instruction having an associated flush condition should be flushed first; and
   (b) first flushing said other instruction having said associated flush condition and in accordance with said associated flush condition because said other instruction is older.

7. The method of claim 1, wherein said shared pipeline stage is a dispatch stage.

8. The method of claim 7, further comprising:
   (a) removing said instructions of said one of said at least two threads associated with said stalled condition from a decode pipeline.

9. The method of claim 7, further comprising:
   (a) removing said instructions of said one of said at least two threads associated with said stalled condition from an instruction buffer.

10. The method of claim 7, further comprising:
    (a) restarting said one of said at least two threads whose instructions were flushed from said dispatch stages and all stages in said processor pipeline prior to said dispatch stage.

11. The method of claim 10, further comprising:
(a) waiting until said stalled condition is resolved before said step of restarting said one of said at least two threads whose instructions were flushed from said dispatch stages and all stages in said processor pipeline prior to said dispatch stage.

12. The method of claim 10, further comprising:
(a) waiting a number of said processor cycles before said step of restarting said one of said at least two threads whose instructions were flushed from said dispatch stages and all stages in said processor pipeline prior to said dispatch stage.

13. A dispatch flush mechanism in a hardware multithread pipeline processor, said pipeline processor simultaneously processing more than one thread, said dispatch flush mechanism comprising:
(a) a fetch stage of said pipeline processor;
(b) a decode stage of said pipeline processor connected to said fetch stage;
(c) a dispatch stage of said pipeline processor connected to said decode stage;
(d) flush prioritize logic connected to said fetch stage, said decode stage, and said dispatch stage of said pipeline processor;
(e) an issue queue of said pipeline processor connected to said dispatch stage;
(f) a plurality of private resources dedicated to each of said threads connected to said issue queue;
(g) thread select logic within said pipeline processor, wherein one of said plurality of instructions of one of said plurality of threads is prevented from passing onto said issue queue because one of said plurality of private resources is unavailable and wherein said thread select logic selects all instructions in said dispatch stage, said decode stage, and said fetch stage belonging to said one of said plurality of threads and said flush prioritize logic issues a signal to remove said all instructions.

14. An apparatus to enhance processor efficiency, comprising:
(a) means to fetch instructions from a plurality of threads into a hardware multithreaded pipeline processor;
(b) means to distinguish said instructions into one of a plurality of threads;
(c) means to decode said instructions;
(d) means to determine if said instructions have sufficient private and shared resources for dispatching said instructions;
(e) means to dispatch said instructions;
(f) means to remove all of said instructions of said one of said plurality of threads from said fetching means and said decoding means and said dispatching means when said determining means determines that one of said instructions of said one of a said plurality of threads does not have sufficient private resources for said dispatch means to dispatch said instruction.

15. A computer processing system, comprising:
(a) a central processing unit;
(b) a semiconductor memory unit attached to said central processing unit;
(c) at least one memory drive capable of having removable memory;
(d) a keyboard/pointing device controller attached to said central processing unit for attachment to a keyboard and/or a pointing device for a user to interact with said computer processing system;
(e) a plurality of adapters connected to said central processing unit to connect to at least one input/output device for purposes of communicating with other computers, networks, peripheral devices, and display devices;
(f) a hardware multithreading pipelined processor within said central processing unit to process at least two independent threads of execution, said pipelined processor comprising a fetch stage, a decode stage, and a dispatch stage;
(g) an instruction stall detector to detect when a resource required in said dispatch stage by an instruction of one of said threads is unavailable and hence said instruction is stalled in said dispatch stage;
(h) flush decode logic to determine if said thread having said stalled instruction has a previous flush condition,
(i) a dispatch flush mechanism to flush said thread having said stalled instruction from said fetch stage, said decode stage, and said dispatch stage if no other previous flush condition exists or if said previous flush condition has a lower priority than said stalled instruction so that said processor can process another of said independent threads of execution with said processor pipeline.

* * * * *